United States Patent
Ledingham

(10) Patent No.: US 6,964,333 B2
(45) Date of Patent: Nov. 15, 2005

(54) CONVEYOR CHAIN GUIDE SYSTEM

(75) Inventor: Stuart J. Ledingham, Coto de Caza, CA (US)

(73) Assignee: Valu Engineering, Inc., Rancho Santa Margarita, CA (US)

( * ) Notice: Subject to any disclaimer, the term of this patent is extended or adjusted under 35 U.S.C. 154(b) by 58 days.

(21) Appl. No.: 09/949,047

(22) Filed: Sep. 7, 2001

(65) Prior Publication Data

US 2003/0047426 A1 Mar. 13, 2003

(51) Int. Cl.[7] ............................................. B65G 15/60
(52) U.S. Cl. ................ 198/841; 198/840; 198/836.3
(58) Field of Search .............................. 198/841, 840, 198/836.3, 836.4, 861.1

(56) References Cited

U.S. PATENT DOCUMENTS

| | | | | |
|---|---|---|---|---|
| 3,508,642 A | * | 4/1970 | Standley et al. .......... | 198/836.3 |
| 4,627,529 A | * | 12/1986 | Tarlton et al. ............ | 198/778 |
| 4,967,897 A | | 11/1990 | Lachonius et al. | |
| 5,186,314 A | | 2/1993 | Clopton | |
| 5,310,047 A | * | 5/1994 | Ledingham ............... | 198/841 |
| 5,361,894 A | | 11/1994 | Solcz | |
| 5,584,377 A | | 12/1996 | Lago | |
| 5,782,340 A | * | 7/1998 | Dolan ...................... | 198/841 |
| 5,810,153 A | * | 9/1998 | Zimmerman et al. ...... | 198/495 |
| 5,857,556 A | * | 1/1999 | Bonacorsi ................. | 198/683 |
| 5,947,264 A | * | 9/1999 | Eltvedt ..................... | 198/816 |
| 6,142,293 A | * | 11/2000 | Ozawa et al. .............. | 198/837 |
| 6,186,318 B1 | * | 2/2001 | Pax et al. .................. | 198/841 |
| 6,202,834 B1 | * | 3/2001 | Layne et al. ............... | 198/852 |
| 6,227,355 B1 | * | 5/2001 | White et al. ............... | 198/841 |
| 6,237,753 B1 | * | 5/2001 | Walter et al. .............. | 198/824 |
| 6,269,939 B1 | * | 8/2001 | Lapeyre et al. ............ | 198/615 |
| 6,427,831 B1 | * | 8/2002 | Norton ...................... | 198/841 |

OTHER PUBLICATIONS

Information Brochures from "Rexnord Sideflexing Tabletop Chains" from p. 14-17.
Miscellaneous Brochures from "ULTOP" in 2 pages.
Miscellaneous pages from "NOLU Plastics" (pp. 104, 107 and 110) Copyright 2000 Solus Industrial Innovations.

* cited by examiner

Primary Examiner—Eileen D. Lillis
Assistant Examiner—Rashmi Sharma
(74) Attorney, Agent, or Firm—Knobbe, Martens, Olson & Bear, LLP

(57) ABSTRACT

Chain guide assemblies for conveyor systems including matched chain guide strips and preassembled straps that interconnect and locate the chain guide strips in constant perpendicular spacing. In certain aspects, the matched chain guide strips are preassembled with the straps to form preassembled chain guide assemblies. The chain guide assemblies can describe straight segments as well as circle segments. The chain guide assemblies present a relatively open configuration to facilitate cleaning and servicing the chain guide assemblies and attached conveyor chains.

16 Claims, 6 Drawing Sheets

CONVEYOR CHAIN GUIDE SYSTEM

BACKGROUND OF THE INVENTION

1. Field of the Invention

This invention relates to the field of conveyor systems and, in particular, to an improved chain guide that offers improved durability and uniformity of positioning of chain guide strips.

2. Description of the Related Art

Conveyor systems are commonly employed in manufacturing applications to transport objects between different processing stations and locations. A conveyor system typically includes a conveyor chain that is arranged in an endless loop and driven about a vertically arranged plane to transport the objects on the chain surface along a generally horizontal, piecewise linear path. Guide rail assemblies are typically placed adjacent and generally parallel with the conveyor chain to retain the objects on the chain surface.

Metal conveyor chains were developed more than 30 years ago and plastic versions followed shortly thereafter. Typical chains include paired tabs or bevels extending inward or outward on each chain segment to retain the chain segments as they travel along a curve of the conveyor track. Each chain segment is typically connected to adjacent segments via integrally formed barrel sections similar to a hinge. An interconnecting pin passes through the barrel sections of adjacent segments thereby joining the segments and forming the endless chain. This hinged chain segment design allows the chain segment top surfaces to remain in a flat plane as the chain is drawn through appropriately spaced guides. The chain guides laterally and vertically locate the chain segments and thus the chain.

The relative placement of various processing stations in a manufacturing application often require that the conveyor system have curves. To provide the most trouble-free operation, the preferred curve is a circle segment. The circle segments preferably intersect either other circle segments or straight runs such that the tangent of the terminal ends of the circle segments are parallel with and intersect adjoining straight segments or other circle segment tangents.

As previously mentioned, the chain segments include either outwardly or inwardly extending tabs for locating the chain segments on a chain guide in a male/female or female/male arrangement respectively. Inwardly extending tabs are generally positioned on the outside edge of the chain segment and thus the chain segments are guided by the edges and supported in the middle.

As the chain typically moves at a high rate of speed and often supports a relatively heavy object load, the material for the chain guide is preferably of high strength and high inherent lubricity. Certain plastics offer a combination of high strength and high inherent lubricity as well as being readily able to be formed into relatively complex shapes. A widely practiced type of chain guide includes individual shaped plastic chain guides that have a generally "L" shaped or rectangular crosssection. These guides can be readily preformed into highly regular circle segments as well as straight segments. However, several difficulties arise in the practice of this chain guide style.

The individual chain guides are typically attached to an underlying metal framework both to physically support the chain guides and to position matched pairs in an equally spaced/parallel arrangement. It will be understood that variations in uniform spacing between opposed guides or unevenness in the curvature can lead to tight or loose sections in the chain guide. Tight sections cause excessive wear at that location and can even lead to the chain binding. Loose sections also lead to excess wear as well as increased noise and vibration. In extreme cases a loose chain guide section can allow the chain to become derailed or vibrate enough to dislodge objects carried on the conveyor.

The chain guides are typically attached either from the sides or above with common fasteners to the metal support framework. The primary difficulties in achieving uniformly spaced, smoothly curved circle segments arise from the construction of the metal framework and the attachment of the guides thereto. Firstly, it is very difficult in practice to accurately form accurate circle segments of the size required for typical conveyor systems. The radius of curvature is typically on the order of feet. Metal circle segments, either of sheet metal, bars, or angles, can become distorted from a perfect circle during handling and assembly.

A second difficulty in configurations where the guides are attached from the side is that the fasteners used to attach the guides to the framework typically have a planar attachment surface whereas the plastic guide has a curved surface. As the fastener is tightened, the curved plastic is forced to flatten in the region of attachment. This leads to a lack of smooth curvature along the curved section of guide.

A third difficulty arises from the typical attachment of plastic to metal with threaded fasteners. While plastic has advantageous properties of strength, lubricity, and ability to be readily formed into curves, it is not well suited to be secured with metal fasteners. It should be noted that conveyor systems are typically run almost continuously at high speeds and with significant weight and vibration loads. This physical stress tends to cause the plastic to cold swage and loosen from the fasteners. It will also be appreciated that only a very limited amount of tightening torque can be applied to plastic as compared to other materials.

As an alternative, a one piece plastic chain guide has been developed that overcomes some of the difficulties previously mentioned. The one piece chain guide defines a semi-enclosed rectangular box cross-section and chain segments with outwardly extending tabs run inside the guide. The one piece chain guide is preformed in circle segments and straight segments thereby eliminating the spacing and uniform curvature problems of the separate guides as previously described.

However, there remain several drawbacks to the one-piece chain guides. Firstly, the one-piece guides are relatively expensive to manufacture. In addition, as a one-piece unit, they have to be replaced in complete segments rather than as individual sides as is possible with separate, opposed chain guide strips. Opposing sides of the strips tend to wear unevenly, particularly in curved sections and replacing entire sections rather than a single side results in increased maintenance costs for conveyor systems based on one-piece chain guides.

A further drawback to the one-piece chain guides is that with a chain installed thereon, an essentially closed space is formed. This closed space readily accumulates debris and makes cleaning the conveyor system extremely difficult. It will be appreciated that for a conveyor system used in a food or medical supply process cleanliness is very important. The closed chain guide also inhibits access to the chain itself greatly reducing the convenience and serviceability of such a system. Finally, the previously mentioned difficulties with attaching a plastic assembly to a metal framework still apply to the one-piece chain guide.

From the foregoing, it will be appreciated that there is a need for a chain guide for conveyor systems that can reliably and inexpensively maintain two opposing chain guides in equally spaced arrangement and maintain a smooth circle segment curvature. There is also a need for a chain guide that avoids enclosure of the chain to facilitate cleaning and access to the chain segments. There is also a need for a chain guide that avoids the need to secure threaded fasteners into plastic material.

SUMMARY OF THE INVENTION

The aforementioned needs are satisfied by the invention which, in one aspect is, a chain guide assembly for conveyor systems, the assembly comprising first and second elongate chain guide strips and a preassembled rigid strap interconnecting the first and second chain guide strips so as to maintain the first and second elongate strips at a constant perpendicular distance and coplanar. In certain aspects, the strap includes a rigid attachment base having a major plane and major axis and a plurality of pins attached adjacent opposite ends of the attachment base so as to extend generally perpendicular from a single side of the major plane and wherein the pins are inserted into matching holes provided in the first and second elongate strips so as to secure the strips via interference fit.

In particular aspects, the first and second elongate chain guide strips are interconnected with a plurality of the preassembled straps so as to form a preassembled chain guide assembly and the strap further includes an elongate attachment opening extending generally along the major axis of the strap.

In another aspect, the invention is a chain guide system for conveyor systems, the chain guide system comprising chain guide assemblies, the chain guide assemblies comprising first and second elongate chain guide strips and a preassembled rigid strap interconnecting the first and second chain guide strips so as to maintain the first and second elongate strips at a constant perpendicular distance and coplanar. The chain guide assemblies can define at least one of straight and circle section paths.

In particular aspects, the chain guide assemblies are adapted to be interconnected so as to abut each other such that terminal ends of each of adjoining first and second elongate chain guide strips are maintained tangentially continuous at points of abutment.

In further aspects, the first and second elongate chain guide strips are interconnected with a plurality of the preassembled straps so as to form preassembled chain guide assemblies and the strap further includes an elongate attachment opening extending generally along a major axis of the strap wherein the attachment opening is adapted to secure the strap to a support framework in a plurality of horizontally arranged positions.

Thus, the chain guide assemblies and chain guide system provide more consistent spacing between opposed guide rails in an open, easy to clean arrangement. The chain guide assemblies use less plastic material, thereby offering cost savings compared to the one-piece chain guides of the prior art. The chain guide assemblies also offer increased durability of the attachment to the plastic guide rails as compared to threaded fasteners. These and other objects and advantages will become more fully apparent from the following description taken in conjunction with the accompanying drawings.

DETAILED DESCRIPTION OF THE PREFERRED EMBODIMENT

Figure 1:
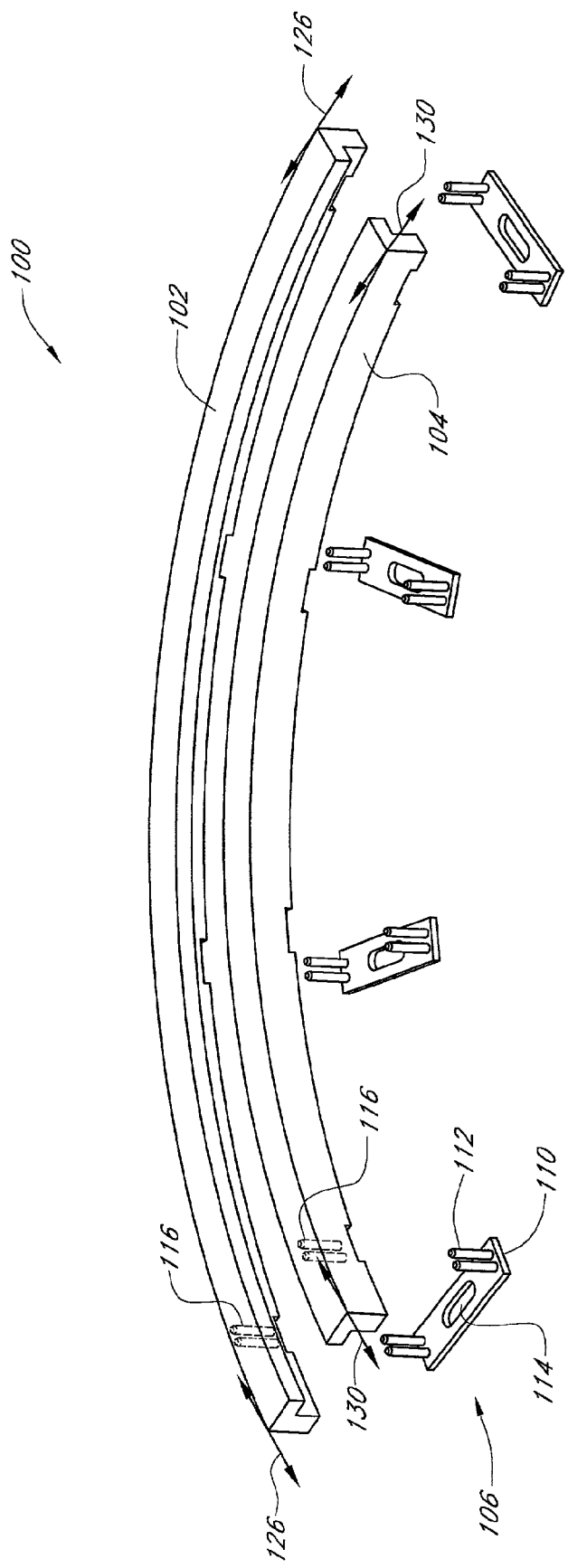
FIG. 1 is a perspective, exploded view of one embodiment of a curved chain guide assembly.
Figure 5:
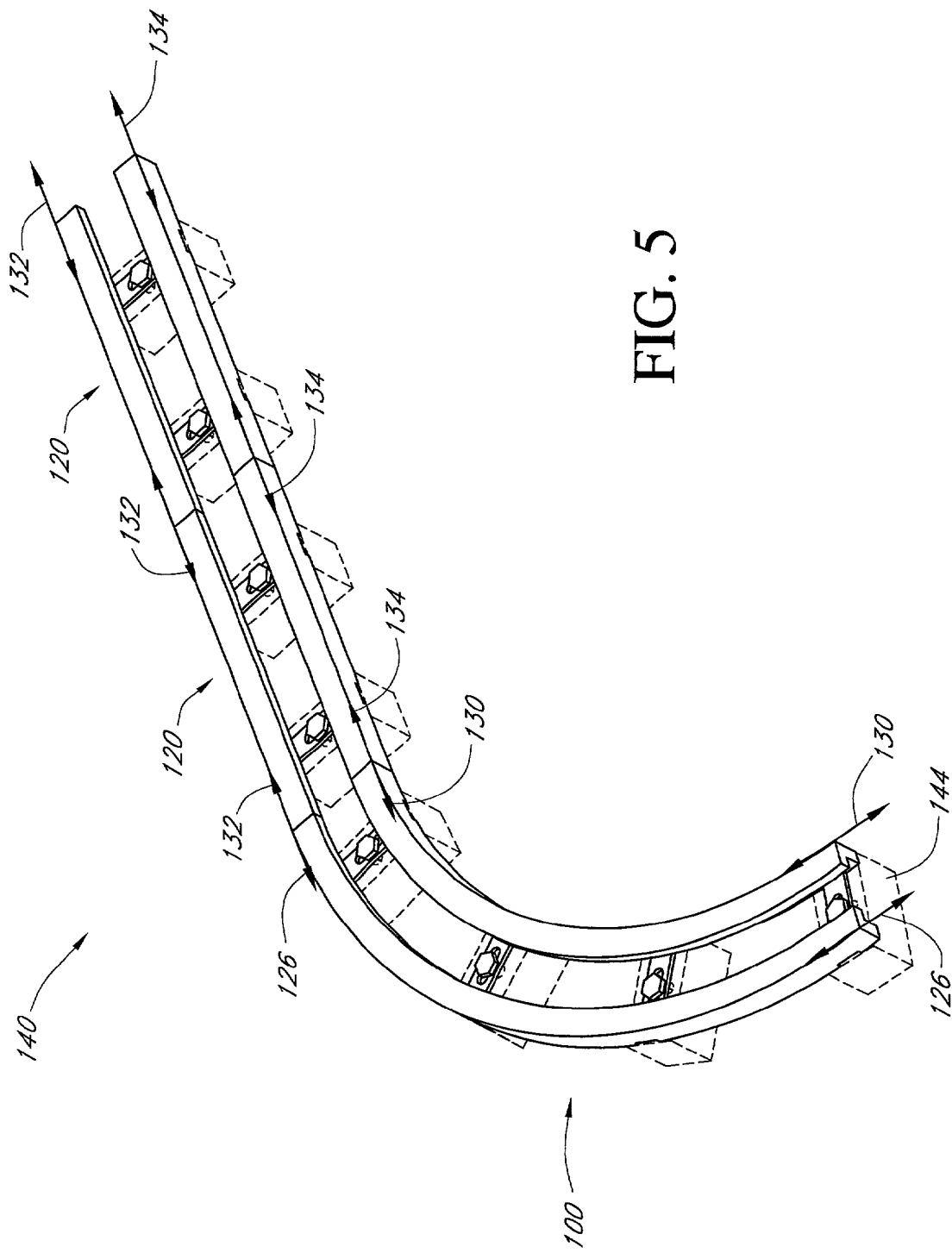
FIG. 5 is a portion of a conveyor chain guide system including the curved and straight chain guide assemblies of FIGS. 2 and 3.

Reference will now be made to the drawings wherein like numerals refer to like parts throughout. FIG. 1 illustrates one embodiment of a curved chain guide assembly 100 in an exploded perspective view. The curved chain guide assembly 100 is adapted to locate and support a conveyor chain in a conveyor system. The conveyor chain can comprise a plurality of interconnected chain links or a continuous belt. The curved chain guide assembly 100 can be used in combination with straight chain guide assemblies 120 (FIG. 3) to enable construction of a conveyor chain guide system 140 (FIG. 5).

The curved 100 and straight 120 chain guide sections are adapted to be interconnected so as to abut adjacent chain guide sections 100, 120 so as to maintain the chain guide sections 100, 120 tangentially continuous at points of abutment. Thus, the chain guide sections 100, 120 facilitate construction of the conveyor chain guide system 140 with smooth transitions between adjoining curved and straight sections and with uniform circle segments in the curved sections in a manner that will be described in greater detail below.

The curved chain guide assembly 100, of this embodiment, comprises a first strip 102 and a second strip 104. The strips 102, 104, in this embodiment, are precision machined from ultra high molecular weight polyethylene (UHMWPE) commercially available. Of course, other suitable materials may be employed such as, reprocessed UHMW, NYLATRON, and lubricated wood. The strips 102, 104 are generally "L" shaped in cross-section and define circle segments with a constant radius of curvature. FIG. 1 illustrates the curved chain guide assembly 100 defining a circle segment of approximately 90°, although it should be appreciated that in other embodiments, the circle segment defined can comprise arcs less than or greater than 90° in order to better accommodate specific applications.

It will be appreciated that the radius of curvature of the first strip 102 is different than that of the second strip 104. The exact radius of curvature required for each of the strips 102, 104 will vary between different applications, however, the appropriate radii will be readily discernable to one of skill in the art. The cross-sectional dimensions and lengths of the strips 102, 104 may also vary between specific applications, however the selection of appropriate dimensions will also be readily apparent to one of skill in the art.

The curved chain guide assembly 100 also comprises strap assemblies 106 (also referred to herein as couplings 106). The strap assemblies 106 interconnect and locate the first 102 and second 104 strips. The straps include an attachment base 110 and a plurality of pins 112. The attachment base 110 and the pins 112 are preferably made of a high strength, corrosion resistant material such as stainless steel. The attachment base 110, in this embodiment, is approximately 4 mm×22 mm×88 mm and is machined or stamped from a flat plate of stainless steel. The attachment base 110 also includes an oblong attachment opening 114 approximately 10 mm.times.31 mm extending therethrough along the major axis of the attachment base 110.

The pins 112 in this embodiment, are approximately 5 mm in diameter and 25 mm long and are made of stainless steel. The pins 112 are attached to the attachment base 110 adjacent opposing ends of the attachment base 110. In this embodiment, two pins 112 are attached with approximately 9 mm center-to-center spacing adjacent each end of the attachment base 110 such that the pins 112 extend generally perpendicular from a single side of the major plane of the attachment base 110. The pins 112 can be attached to the attachment base 110 via welding, swaging, or other known methods of attaching separate pieces. In alternative embodiments, the strap assembly 106 can be machined as a one-piece assembly. These dimensions given for the attachment base 110 and the pins 112 are exemplary of one embodiment and can be readily changed to accommodate alternative applications without detracting from the scope of the invention.

Lower sides of the strips 102, 104 are provided with a plurality of holes 116 positioned and sized so as to closely mate with the pins 112. In particular, the pins 112 of the strap assemblies 106 are pressed into the holes 116 so as to interference fit within the holes 116. In certain embodiments, the pins 112 are provided with knurling, checkering, or splines to better secure the pins 112 within the holes 116. In certain embodiments, the pins 112 can also be beveled at ends of the pins 112 distal from the attachment base 110 to facilitate insertion of the pins 112 into the holes 116. In preferred embodiments, the straps assemblies 106 are pre-assembled and the holes 116 in the strips 102, 104 are predrilled so as to provide the closer tolerances available in a precision manufacturing facility (on the order of hundredths of a millimeter) as compared to the relative inaccuracy of field assembly of separate attachment bases 110 and pins 112 and drilling of the holes 116.

It will be appreciated that the UHMWPE comprising the strips 102, 104 is somewhat resilient and thus will exert a compressive force on the pins 112 inserted into the holes 116, thus strongly retaining the strips 102, 104 thereon. The rigid nature of the strap assemblies 106 hold the strips 102, 104 in precise spacing and orientation. It will further be appreciated that a simple insertion of the pins 112 into the holes 116 rather than the threading typically employed in the prior art is a more durable method of attaching to the plastic strips 102, 104.

Figure 3:
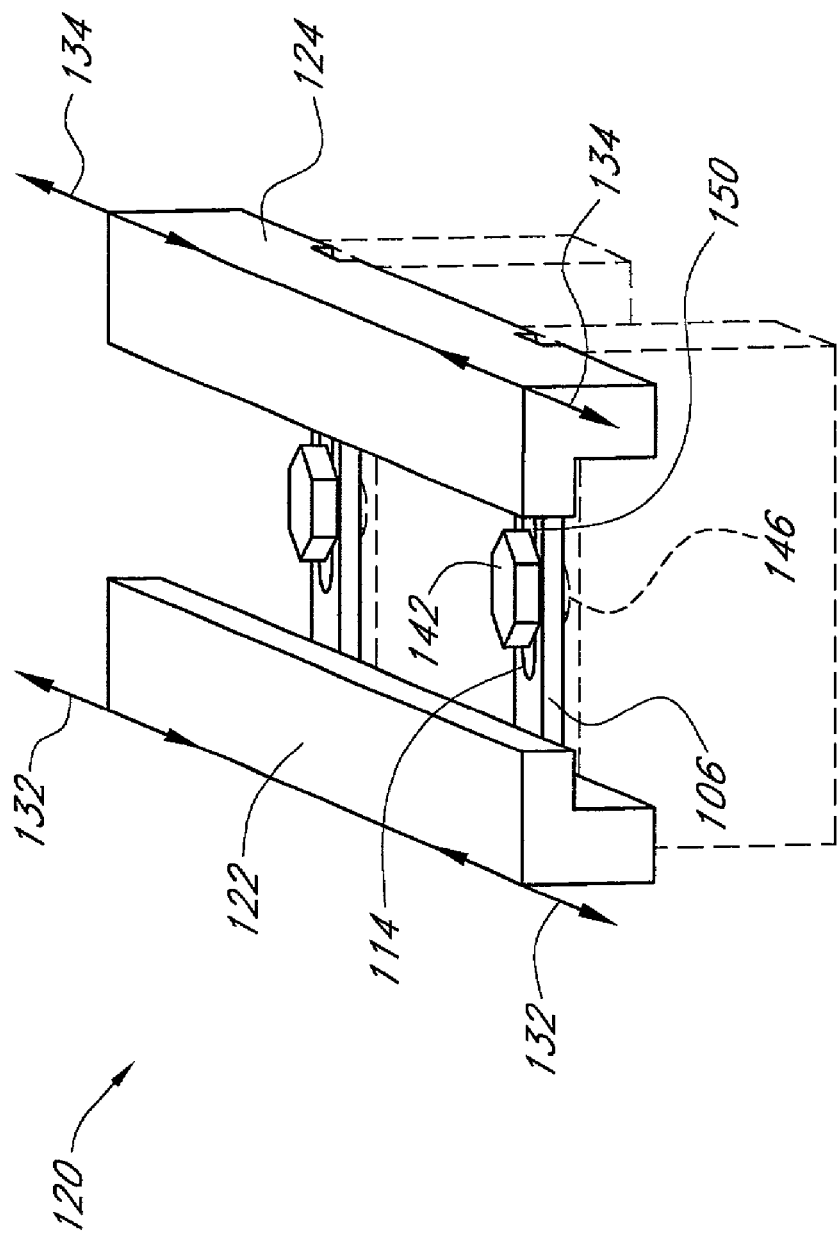
FIG. 3 is a perspective view of a straight chain guide assembly.

In addition, in a preferred arrangement, the strips 102, 104 and the interconnecting strap assemblies 106 are positioned such that the pins 112 extend upwardly such that vertical weight loads of the strips 102, 104 and attached chain and objects are directed downwards so as to bear on the strap assemblies 106 (FIGS. 3 and 5). Thus, in a preferred embodiment, there is minimal static radial loading on the pins 112 thus further minimizing the likelihood of loosening of the pins 112 within the holes 116 over time and use. It will also be appreciated that the holes 116 are predrilled in the strips 102, 104 to mate with the strap assemblies 106 and thus the smooth circle segment contour of the strips 102, 104 is maintained and not distorted by the attachment of the strap assemblies 106 thereto.

FIG. 3 is a perspective view of an assembled straight chain guide assembly 120. The straight chain guide assembly 120 comprises first 122 and second 124 strips interconnected by a plurality of the strap assemblies 106. The strips 122, 124 are elongate, substantially straight segments otherwise substantially identical to the strips 102, 104 as previously described. It will be appreciated that, as the strips 122, 124 are straight, each of the strips 122, 124 can be substantially identical which is not feasible with the strips 102, 104 which have different radii of curvature. In certain embodiments of the invention, it may be preferable to preassemble the strips 102, 104 or 122, 124 with strap assemblies 106 to form preassembled chain guide assemblies 100, 120.

Figure 2:
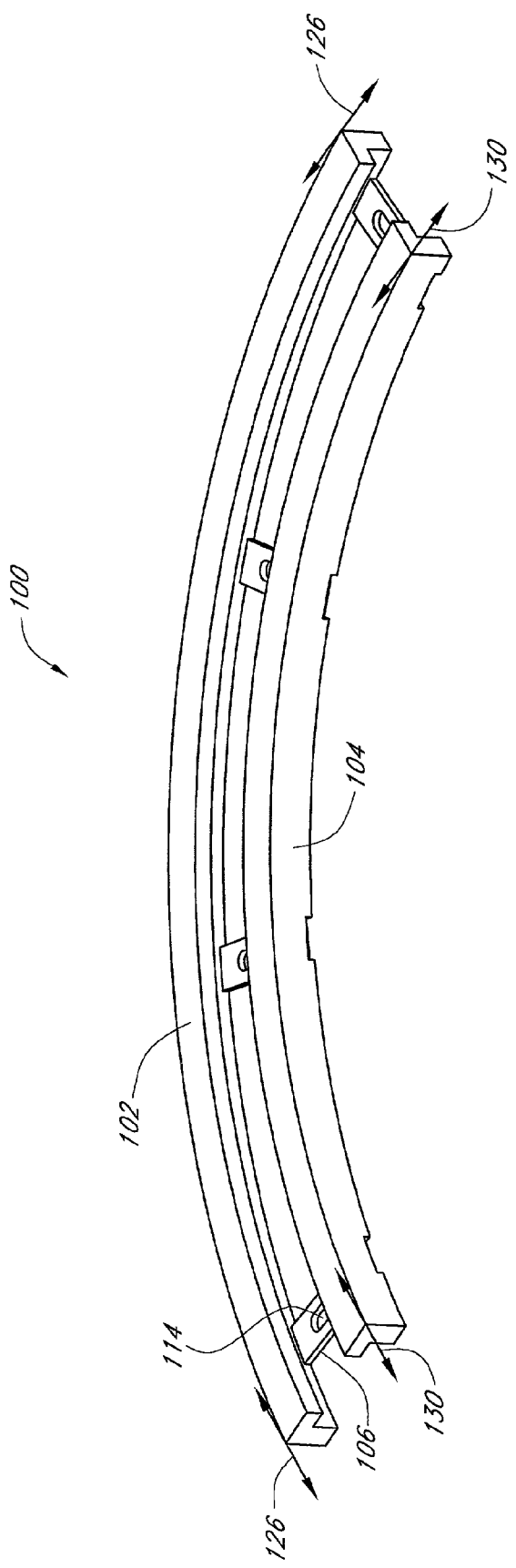
FIG. 2 is a perspective view of the curved chain guide assembly of FIG. 1 in an assembled configuration.

Each of the strips 102, 104, 122, 124 define tangents 126, 130, 132, 134 respectively at each end of the strips 102, 104, 122, 124 as shown in FIGS. 2 and 3. The tangents 126, 130, 132, 134 are shown aligned with outsides edges of the strips 102, 104, 122, 124 however, the tangents 126, 130, 132, 134 can readily be considered with other regions of the strips 102, 104, 122, 124 as will be readily apparent to one of skill in the art.

The straight chain guide assembly 120 is shown in FIGS. 3 and 5 attached via fasteners 142 to a support framework 144. The fasteners 142, in this embodiment, comprise standard bolts and mating nuts, however in alternative embodiments, the fasteners 142 can comprise rivets and backing plates, clinching, welding, or other known methods and/or devices for attaching separate assemblies. In preferred embodiments, the support framework 144 includes attachment openings 146 positioned underlying and adjacent the strap assemblies 106. The attachment openings 146 are preferably oblong and oriented as to overlap and be substantially perpendicular to the attachment openings 114 of the strap assemblies 106. This preferred relative arrangement of the attachment openings 114, 146 provides an intersection 150 defined by the overlap of each of the attachment openings 114, 146.

Figure 4:
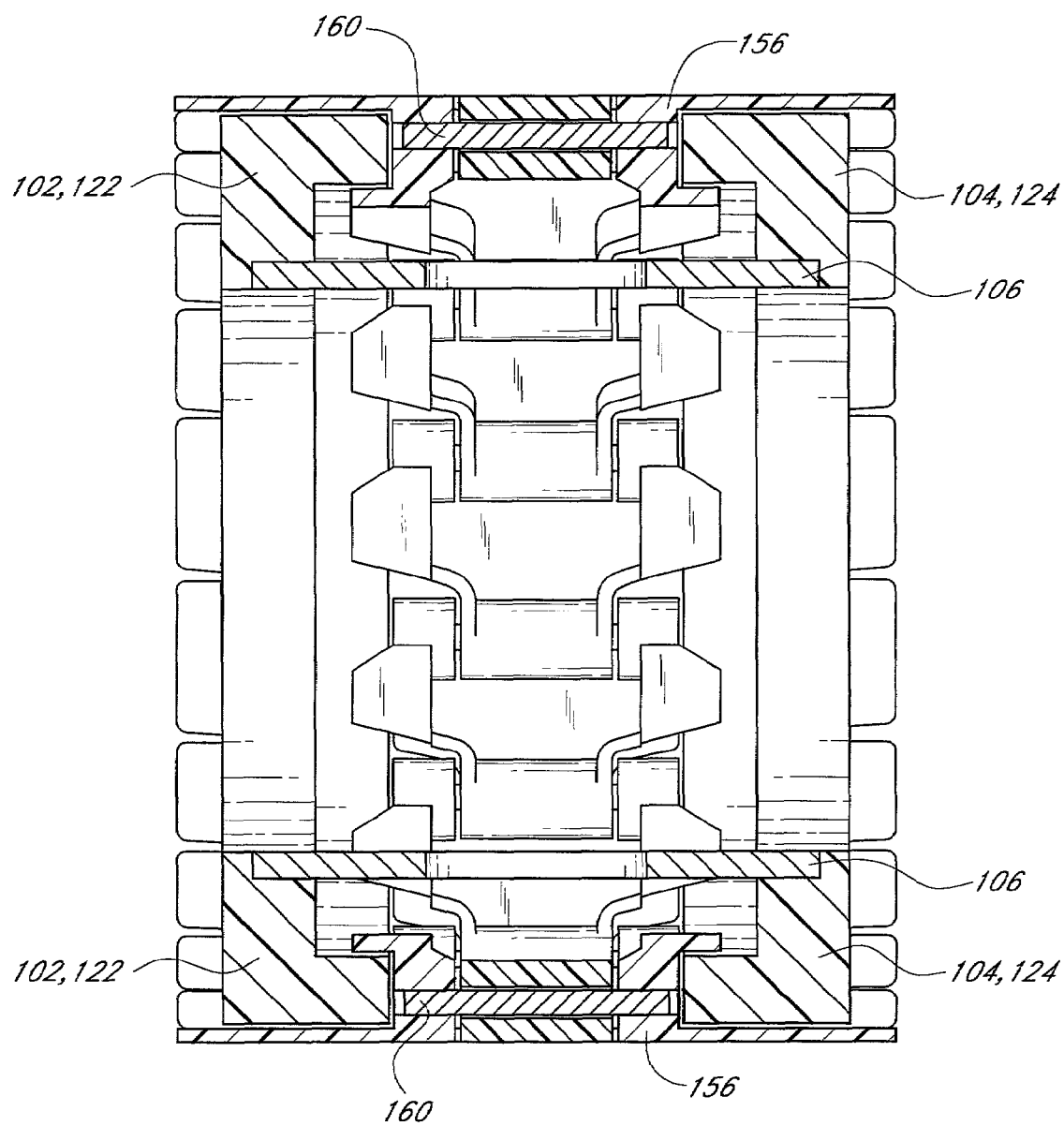
FIG. 4 is a section view of the chain guide assemblies of FIGS. 2 or 3 with an attached conveyor chain.

FIG. 4 is a section view of the chain guide assemblies 100, 120 with a section of chain link 156 attached. The chain link 156 in this embodiment is made of high strength plastic and is connected to adjacent chain links 156 via integral barrel portions and link pins 160 in a well known manner. The chain links 156 and link pins 160 are readily commercially available. It should be understood that FIG. 4 illustrates the relative relationship between the chain guide assemblies 100, 120 and a chain and in alternative embodiments, the chain can comprise alternative types of chain links or continuous conveyor belts without detracting from the spirit of the invention.

It can be seen in FIG. 4 that the chain links 156 are located both vertically and laterally by the opposed strips 102, 104 or 122, 124 as interconnected by the strap assemblies 106. The cross-sectional dimensions of the strips 102, 104, 122, 124 and the lateral spacing therebetween is preferably chosen with respect to the dimensions of the chain so as to inhibit binding of the chain links 156 during movement of the chain and provide adequate clearance for cleaning the chain guide assemblies 100, 120 and the chain links 156, yet inhibit excessive play to reduce noise, vibration, and wear. Appropriate dimensions will be readily apparent to one of skill in the art. It will be also be appreciated that the size of the pins 112 and the holes 116 is preferably chosen such that the pins 112 do not protrude beyond the outer surface of the strips 102, 104, 122, 124 to avoid interference between the pins 112 and the moving chain links 156.

FIG. 5 is a perspective view of one embodiment of a portion of a conveyor chain guide system 140. The conveyor chain guide system 140, of this embodiment, comprises the curved chain guide assembly 100 and the straight chain guide assembly 120 interconnected so as to form the continuous conveyor chain guide system 140. In particular, the curved chain guide assembly 100 and the straight chain guide assembly 120 are attached to the underlying support framework 144 via fasteners 142 extending through the intersections 150.

The intersections 150 provide a degree of variability in the relative positioning of the chain guide assemblies 100, 120 with respect to the support framework 144 via the oblong and perpendicularly arranged attachment opening 114, 146. It is preferred to attach the adjacent chain guide assemblies 100, 120 to the support framework 144 such that the adjacent chain guide assemblies 100, 120 immediately abut each other with minimal gap therebetween and such that the tangents 126, 130, 132, 134, as appropriate, of each adjacent chain guide assembly 100, 120 are collinear with the tangents 126, 130, 132, 134 of other adjacent chain guide assemblies 100, 120. This collinearity of the adjacent tangents 126, 130, 132, 134 provides smoother conveyor chain travel thereby minimizing vibration, noise, and disruption to objects carried on the conveyor chain.

As seen in FIGS. 4 and 5, the conveyor chain guide system 140, of this embodiment, provides a relatively open configuration. In particular, the conveyor chain guide system 140 has essentially no closed areas and minimal areas where debris could accumulate. Debris that may be generated by or introduced to a conveyor system employing the conveyor chain guide system 140 of this embodiment will tend to fall between the strips 102, 104, 122, 124. Debris that may accumulate on upper surfaces of the strap assemblies 106 will tend to be swept off by the moving chain links 156 and thus be directed away from the conveyor chain guide system 140. In addition, the openings between the strips 102, 104, 122, 124 and the straps 106 provides improved access for servicing the conveyor chain guide system 140 as well as the chain links 156 and the link pins 160.

Figure 6:
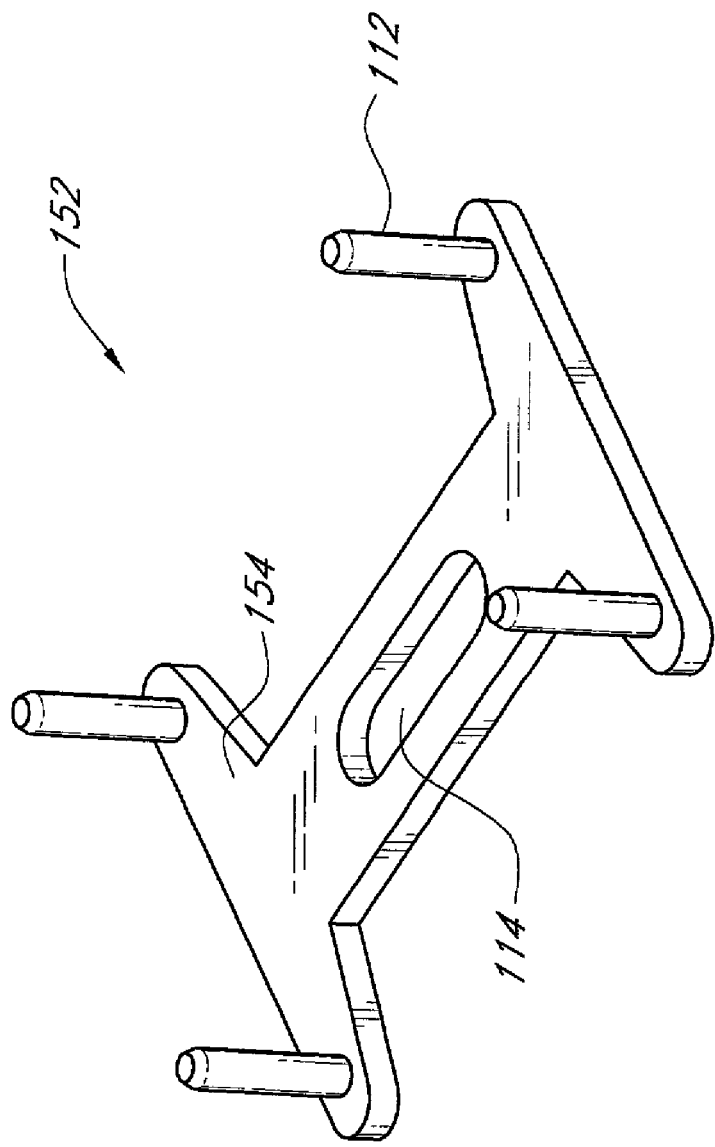
FIG. 6 is a perspective view of an alternative embodiment of a strap assembly.

FIG. 6 is a perspective view of an alternative embodiment of a strap assembly 152. The strap assembly 152 is substantially identical in materials, construction, and function as those previously described for the strap assembly 106. However, the strap assembly 152 has a truss base 154 in place of the attachment base 110. The truss base 154 is adapted to position the pins 112 with greater spacing therebetween. In certain applications, it is desirable to distance the pins 112 further apart than in the strap assembly 106. The greater spacing between the pins 112 in the strap assembly 152 reduces potential weakening of the strips 102, 104, 122, 124 induced by relatively close placement of the holes 116 therein while still maintaining rigid interconnection of the pins 112. FIG. 6 illustrates the truss base 154 having a generally "I" shape, however, in alternative embodiments, the truss brace 154 can have an "H" or "X" shape.

Although the foregoing description of the preferred embodiment of the present invention has shown, described, and pointed out the fundamental novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited to the foregoing discussions, but should be defined by the appended claims.

What is claimed is:

1. A system for guiding a conveyor chain along a conveyor path, the system comprising:
   first and second guide strips having cross-sections comprising upside down L shapes with a horizontal leg oriented above a vertical leg, the first and second guide strips being positioned along the conveyor path such that the horizontal legs extend towards a common center between the first and second guide strips, each of the first and second guide strips having a plurality of circular openings in a bottom surface of their vertical legs;
   a plurality of mounting brackets, each bracket comprising a substantially planar plate having at least two connectors extending upwards from the plate, the connectors being inserted into the circular openings in the bottom surface of the vertical legs of the guide strips.

2. The system of claim 1, wherein each of the brackets comprises a central portion with an opening configured to receive a bolt therethrough.

3. The system of claim 1, wherein each of the brackets comprises four connectors extending perpendicularly from the plate, and wherein first and second connectors on a first end of the bracket are configured to be received in circular openings of the first guide strip, and wherein third and fourth connectors located at an opposite second end of the bracket are configured to be received in the second guide strip.

4. The system of claim 1, wherein the first and second guide strips comprise a plurality of strip segments positioned along the conveyor path.

5. The system of claim 4, wherein the strip segments comprise circular openings in the bottom surface of the vertical leg at locations adjacent opposite ends of the strip segments.

6. The system of claim 5, wherein the brackets are configured to be laterally adjustable along a line perpendicular to the first and second guide strips.

7. The system of claim 4, wherein the strip segments are curved in a plane parallel to the plane of the bracket plate.

8. The system of claim 7, wherein the strip segments comprise circular arcs.

9. The system of claim 8, wherein each of the brackets comprises a planar body having first and second connectors extending perpendicularly from a first end of the body, and third and fourth connectors extending perpendicularly from a second end of the body, wherein the first and second connectors are received in the first guide strip, and wherein the third and fourth connectors are received in the second guide strip.

10. The system of claim 9, wherein a line drawn between the first connector in the first guide strip and the third connector in the second guide strip is a radial line of the circular arcs of the first and second guide strips.

11. The system of claim 8, wherein a first strip segment of the first guide strip comprises a circular arc with a first radius, and a second strip segment of the second guide strip comprises a circular arc with a second radius that is smaller than the first radius, and wherein the first and second strip segments are assembled with a plurality of brackets such that the first radius and the second radius have a common center.

12. The system of claim 11, wherein each of the brackets comprises an elliptical opening with a major axis, said major axis lying on a radial line of the circular arcs.

13. The system of claim 1, wherein a distance between an inner vertical surface of the vertical leg of the first chain guide and inner vertical surface of the vertical leg of the second chain guide is larger than a width of a portion of a conveyor chain to be guided therein.

14. The system of claim 1, wherein a height between a plane of bottom surfaces of the horizontal legs of the first and second guide strips and a top surface of the bracket plate is larger than section of conveyor chain to be guided therebetween.

15. The system of claim 1, wherein each of the brackets comprises a planar body having first and second connectors extending perpendicularly from a first end of the body, and third and fourth connectors extending perpendicularly from a second end of the body, wherein the first and second connectors are received in the first guide strip, and wherein the third and fourth connectors are received in the second guide strip.

16. The system of claim 1, wherein the connectors comprise pins.

* * * * *

UNITED STATES PATENT AND TRADEMARK OFFICE
CERTIFICATE OF CORRECTION

PATENT NO. : 6,964,333 B2  Page 1 of 1
APPLICATION NO. : 09/949047
DATED : November 15, 2005
INVENTOR(S) : Stuart J. Ledingham It is certified that error appears in the above-identified patent and that said Letters Patent is hereby corrected as shown below:

Title Page, Col. 1 (U.S. Patent Documents), between Lines 3 and 4, below "4,967,897" insert --5,170 881 * 12/1992 Willison 198/689.1--.

Title Page, Col. 1 (US. Patent Documents), Line 6, delete "Solcz" and insert --Solez-- therefor.

Col. 1, Line 57, delete "crosssection." and insert --cross-section-- therefor.

Col. 1, Line 58, delete "preformed" and insert --pre-formed-- therefor.

Page 3, Col. 2, Line 40, delete "preformed" and insert --pre-formed-- therefor.

Signed and Sealed this

Third Day of March, 2009

JOHN DOLL
*Acting Director of the United States Patent and Trademark Office*